April 25, 1967     JIICHI KAMITANI ET AL     3,315,658

BODY WARMERS

Filed Dec. 27, 1965     6 Sheets-Sheet 1

INVENTORS
Jiichi Kamitani
Kanau Kawauchi

BY Stevens, Davis, Miller & Mosher    ATTORNEYS

April 25, 1967  JIICHI KAMITANI ET AL  3,315,658
BODY WARMERS

Filed Dec. 27, 1965  6 Sheets-Sheet 3

INVENTORS
Jiichi Kamitani
Kanau Kawauchi

BY Stevens, Davis, Miller & Mosher

ATTORNEYS

INVENTORS
Jiichi Kamitani
Kanau Kawauchi
BY Stevens, Davis, Miller & Mosher
ATTORNEYS April 25, 1967  JIICHI KAMITANI ET AL  3,315,658
BODY WARMERS Filed Dec. 27, 1965  6 Sheets-Sheet 6

INVENTORS
Jiichi Kamitani
Kanau Kawauchi
BY
Stevens, Davis, Miller & Mosher
ATTORNEYS United States Patent Office 3,315,658
Patented Apr. 25, 1967

3,315,658
BODY WARMERS
Jiichi Kamitani and Kanau Kawauchi, both of Osaka, Japan, assignors to Matsushita Electric Industrial Co., Ltd., Osaka, Japan, a corporation of Japan
Filed Dec. 27, 1965, Ser. No. 516,614
Claims priority, application Japan, Sept. 1, 1965, 40/54,166
10 Claims. (Cl. 126—208)

This invention relates to body warmers of the type adapted to burn liquid fuel with the aid of the catalytic action of platinum and which is usable to warm any selected portion of the user's body such as the back waist or belly, if required, with the aid of a belting and, when the user is seated, can also be laid on his laps or under his hips. This type of body warmer is particularly suited for use outdoors, for example, in witnessing games and fishing.

The present invention has for its object to provide a simple, safe and efficient body warmer of the type described in which all the components needed to burn liquid fuel with the aid of the catalytic action of platinum, including an oil tank or reservoir, a combuster-element holder carrying a platinum-asbestos element, a closure plate adapted to fit in the opening formed in the warmer casing for exchange of the combuster element and including an auxiliary cover plate, ignition switching means, and fuel feed means including a fuel-replenishing port and a fuel inlet port, are mounted concentratedly on the warmer casing so that the assembling operation can be performed with convenience, simplicity and efficiency, ensuring accurate fuel ignition and combustion while at the same time warranting use with safety.

Another object of the present invention, is to provide a body warmer of the type described which is generally arcuate in transverse cross section having arcuate front and back surfaces to make an improved contact engagement with the user's body portion to be heated and which is thus reasonable in general configuration, high in warming efficiency, and conveniently usable.

A further object of the present invention is to provide a body warmer of the type described in which the oil tank has a tunnel-like through hole formed centrally thereof substantially in alignment with the combuster-element exchange opening in the casing bottom and a gasified-fuel feed port formed in the wall of said through hole with an ignition wick arranged adjacent to said feed port to present itself to the ignition unit including an ignition heater in a manner so that upon operation of the ignition switch of the warmer the ignition heater is energized by a battery power to effect fuel ignition without fail and thus any reduction in combustion efficiency due to contamination of the platinum-asbestos element unavoidable with the case where a match is used to ignite fuel is effectively prevented, and in which the combuster element can be conveniently replaced with extreme ease through the exchange opening in the casing bottom simply by removing the closure plate therefrom, as required in case the platinum-asbestos element be contaminated or otherwise deteriorated or the ignition circuit be broken, for example, on account of the snapping of the heater wire.

A further object of the present invention is to provide a body warmer of the type described in which a tunnel-like through hole, circular, elliptical, square or otherwise suitably shaped in cross section is formed in the oil reservoir eccentrically thereof so as to extend between the top and bottom walls of the oil reservoir whereby, for example, when the body warmer is set in a vertical position with its edge opposite to the gasified-fuel feed port turned downward, that portion of liquid fuel previously held in the oil tank on one side of the tunnel-like through hole immediately rushes under gravity into the other side of the oil tank through its restricted passages formed along the through hole so that any draining of the liquid fuel through the gasified-fuel feed port and hence its dripping off the combuster unit are prevented, effectively eliminating the danger of leaping flames or unusual combustion of fuel thereby to ensure safety in use of the warmer.

Still another object of the invention is to provide a body warmer of the type described including a combuster unit of a sturdy unitary structure which can be detachably fitted in the warmer with extreme ease and includes a combuster-element holder of a heat- and corrosion-resistant metal material U-shaped in cross section and having an opening to enclose the gasified-fuel feed port and a mounting lug extending laterally from one longitudinal edge of said opening with a plurality of through apertures formed in both legs of said U-shaped holder for air supply to the platinum-asbestos element, which is accommodated in the U-shaped holder with a gas permeable, heat- and corrosion-resistant retainer ring encircling the platinum-asbestos element and held against movement toward said opening by means of inturned lugs formed on the opposite legs of said U-shaped holder.

Another object of the present invention is to provide an improved body warmer of the type described in which the combuster unit including a combuster-element holder and a platinum-asbestos element is arranged on one side wall of the tunnel-like through hole of a considerably large space, formed in the oil reservoir centrally thereof, so as to obtain an increased rate of fuel gasification which enables production of combustion heat at a high rate despite the limited size of the platinum-asbestos element.

Yet another object of the present invention is to provide a body warmer of the type described which is extremely safe in use including an extinguisher plate carried on the auxiliary cover plate, fitted in the closure plate, in a position to cover the ignition unit when the auxiliary cover plate is closed, thereby to interrupt air supply to the ignition unit in cooperation with the combuster-element holder and a food member forming part of the ignition unit thereby to ensure that the flame formed on the ignition wick is extinguished after the flame has been transferred to the combuster unit to start normal combustion of fuel and that during combustion formation of an igniting flame on the ignition wick is effectively prevented even if the ignition circuit is inadvertently energized by misoperation on the part of the user.

A further object of the invention is to provide a body warmer of the type described in which the closure plate carries on its inside surface opposite to the combuster-element holder a temperature indicating device including a bimetal indicator member and a viewing window enabling the user to observe the temperature indication of the member from outside whereby the user can conveniently ascertain the temperature of the atmosphere around the combuster unit.

A still further object of the present invention is a body warmer of the type described which comprises fuel feed means of a simple and rational design including an inwardly protruding tubular oil-replenishing port formed in the bottom of the warmer casing, a fuel inlet port formed in the wall portion of the oil tank in a position opposite to the extremity of said tubular oil-replenishing port, a fuel inlet bushing formed with a fluid passage extending axially thereof and adapted to be closely fitted to said oil-replenishing port, and a valve disc disposed inside of the oil tank so as to be normally held in closely contacting relation with the adjacent end of the fuel inlet bushing to close said inlet port whereby oil replenishment can be effected simply by applying the extremity of an oil-dispenser tube against the valve disc and, as soon as the oil dispenser tube is removed after such fuel replenishment, the fuel inlet port is automatically closed to prevent escapement of gasified fuel.

A further object of the present invention is to provide a body warmer of the type described which further comprises a fuel guide member fitted inside of the oil tank and defining therein a cavity in a position opposite to the fuel inlet bushing for receiving the valve plate and a conduit channel extending from said cavity toward the end of said guide member remote therefrom and opening into the gasified-fuel feed port so that at least a portion of oil charged is immediately directed to the gasified-fuel feed port and leaves the latter in a gasified state to enable fuel ignition and even in cases the amount of oil charged is limited, the fuel can immediately be delivered through the gasified-fuel feed port in a gasified state since the fuel is collected to immerse the region of the gasified-fuel feed port as soon as it is charged whereby the same satisfactory combustion efficiency can be obtained irrespective of the amount of oil charged, admitting that the duration of fuel combustion for a limited charge of oil is obviously limited compared to that when the oil tank is fully charged.

These and other objects, features and advantages of the present invention will become apparent from the following detailed description when taken in conjunction with the accompanying drawings, in which.

Figure 1:
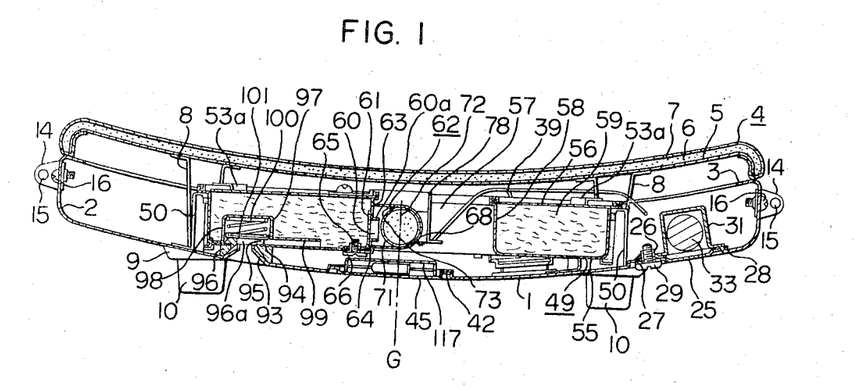
FIG. 1 is a transverse cross-sectional view of a body warmer embodying the present invention.
Figure 2:
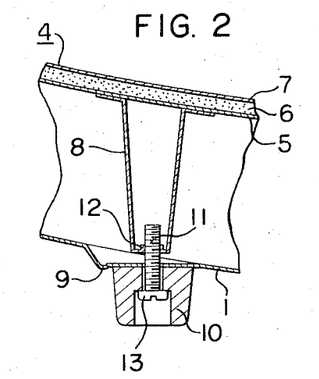
FIG. 2 is an enlarged fragmentary cross section taken along the line A—A in FIG. 4, illustrating the manner in which the warmer casing and its cover pad are secured together.
Figure 3:
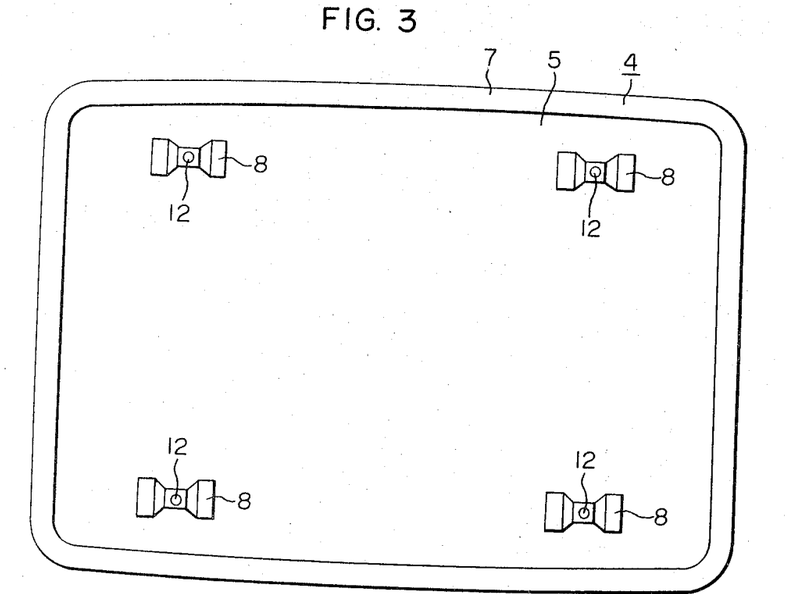
FIG. 3 is a bottom plan view of the cover pad.

Referring to the drawings, reference numeral 1 indicates a rectangular main casing of steel or other metal sheet including side walls 2 and an opening 3 extending over a major portion of the casing top. The casing 1 is formed generally arcuate in transverse cross section, as shown in FIG. 1, so that it may conform to the profile of the user's waist back or abdomen to which it is applied in use. A cover pad or closure member 4 is detachably secured to the top of the casing to cover its opening 3 and includes a heat-conducting steel or other metal sheet 5 transversely curved in conformity to the arcuate profile of the casing and dimensioned correspondingly thereto to close the top opening 3 of the casing. Formed on the underside of the metal sheet 5 are a plurality of U-shaped support legs 8 to serve the purpose described below. The outer surface of the metal sheet 5 is covered by a woven fabric 7 with a cushioning material 6, such as foamed synthetic resin, felt or textile cloth, interposed therebetween. The pad 4 is coveringly secured to the casing 1 by means of the support legs and in use serves to make heat distribution uniform and at the same time makes pleasant the user's feeling when it is applied to his body portion owing to the use of cushioning material 6 and woven fabric 7. The edges of the woven fabric 7 are most conveniently folded back onto the underside of the metal cover plate 5 and firmly secured thereto by use of a heat-resistant adhesive agent. Reference numeral 9 indicates flat shouldered portions formed on the bottom of the casing in positions opposite to the support legs 8 with feet 10 of rubber or the like material secured to the bottom of said shouldered portions 9. A common aperture 11 is formed in each of the shouldered portion 9 and associated foot 10 and a threaded bolt 13 is inserted through the aperture 11 to engage the threaded aperture 12 (FIG. 2) formed in the bottom of the adjacent support leg 8 thereby to securely hold the cover pad 4 in a position to cover the top opening 3 of the position.

Figure 4:
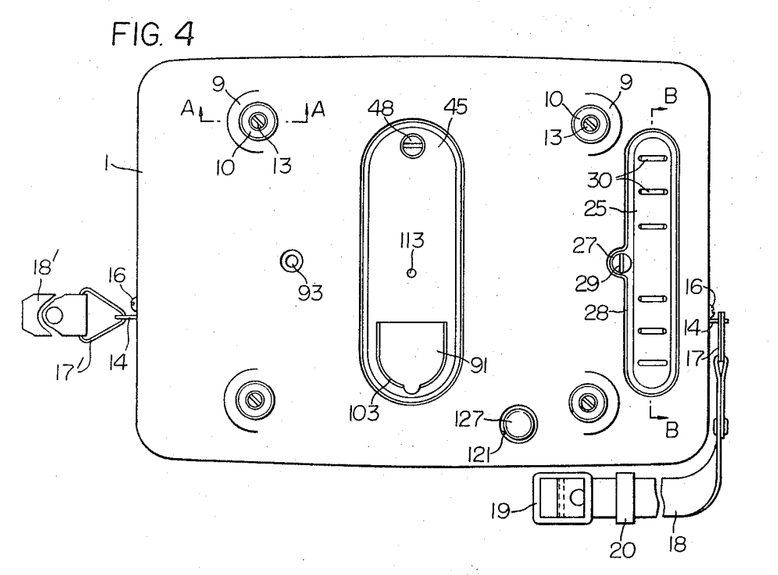
FIG. 4 is a bottom plan view of the main casing of the warmer.

A pair of fixtures 14 formed of sheet metal are secured to the opposite sides of the casing 1, for example, by screw means 16 and each is formed with an eyelet 15. A pair of triangularly or rectangularly shaped connecting links 17, 17' of wire are loosely fitted in said eyelets 15 of the fixtures 14 (FIGS. 1 and 4). Carrying bands 18, 18' of synthetic resin or the like material are secured at one end to the respective connecting links 17, 17' by riveting or other suitable means with a buckle 19 secured to the free end of one of said bands 18 for detachable engagement with the free end portion of the other band 18'. This buckle 19 takes the form of a rectangular frame having a cross link defining a pair of rectangular openings so that when passed through the buckle in a zigzag fashion the free end portion of the other band 18' is held in an adjustable position relative to the adjoining end of the band 18 to give a combined band length conforming to any particular conditions under which the warmer is used. A band retainer 20 is loosely fitted over the free end portion of the band 18, carrying the buckle, to serve the purpose of holding the free end portion of the other band 18', when it is extended through the buckle, closely along the end portion of the band 18.

Formed in the bottom wall of the casing 1 along one of its lateral sides is an elongated aperture 21 having depressed marginal portions 22 formed around the periphery thereof. Formed in one of the longitudinally extending depressed portions 22 remote from the adjacent lateral edge of the casing is a threaded bore 23 and a plurality of engaging apertures 24 are formed in the other longitudinal depressed portion 22. Reference numeral 25 indicates a battery encasement cover of sheet metal or synthetic resin material shaped to fit to the depressed marginal portions 22. On one longitudinal edge of the cover 25 is formed a lug 27 formed with a through aperture 26 in a position to align with the threaded bore 23 while tabs 28 are formed on the other longitudinal edge of the cover 25 to cooperate with the engaging apertures 24. To secure the cover 25 in place on the casing 1, it is first positioned by inserting its tabs 28 into respective apertures 24 and then a clamping screw 29 is threaded into the bore 23 through the aperture 26 formed in the lug 27 of the cover 25 to releasably clamp the cover 25 to the casing 1 (FIGS. 1 and 4). A plurality of vent holes 30 are formed in the battery encasement cover 25 for the purpose of preventing any excessive temperature rise in the encasement 31. The battery encasement 31 is generally U-shaped in cross section having an opening conforming to the aperture 21 formed in the casing bottom. As shown in FIG. 6, lugs 32 are formed on the peripheral edge of the aperture 21 to hold the battery encasement 31, formed of sheet metal or synthetic resin material, in place within the casing 1 so that battery cells 33 can be fitted in the encasement 31 through the aperture 21. The battery encasement 31 includes an electroconductive abutment plate 36 secured as by welding to one end of the U-shaped encasement 31 with an electroconductive spring 34 of brass or other wire material held fixed by lugs 35 formed on the abutment plate 36. The encasement 31 includes at the other end an abutment plate 37 formed of Bakelite, mica sheet or other electrical insulating material and fixed in place by caulking or other suitable means. A contact piece 38 of brass or other electroconductive material is fixed to the center of the abutment plate 37 as by caulking so as to extend therethrough. Insulated conductors 39 and 39' are connected to the contact piece 38 and the electroconductive abutment 36, respectively, to form an ignition circuit described below (FIGS. 1, 5, 6 and 7). To obtain a capacity required to red-heat the ignition heater, each of battery cells of 1.5 v. is accommodated in the encasement in series connection. The positive terminal of the series connection of the battery cells, usually two in number, is held in contact with the contact piece 38 and the negative terminal with the spring 34, which is effective to maintain satisfactory contact between the battery cells and between the contact piece 38 or spring 34 and the adjacent battery cell to minimize the contact resistance between the components.

A combuster-element exchange opening 40 of a nearly elliptical configuration is formed in the bottom plate of the casing 1 medially thereof to extend in parallel to the aperture 21 for battery insertion. Formed around the periphery of the opening 40 is a depressed or inwardly offset circumferential shoulder 42 which is formed with a recess 43 adjacent to one of its apices and a threaded bore 44 adjacent to the other apex. A closure plate 45 provided to cover the exchange opening 40 is formed of sheet metal or other heat-resistant material and shaped to fit to the shoulder 42. An engaging lug 46 is formed on one end of the closure plate in a position to cooperate with the recess 43 formed in the circumferential shoulder 42 while a through aperture 47 is formed in the other end of the closure plate in a position to align with the threaded bore 44. The closure plate 45 can be secured to the casing bottom in the same manner as described in connection with the battery encasement cover 25, that is, by first bringing the engaging lug 46 into engagement with the recess 43 and then threading a screw stud 48 through the through aperture 47 into the threaded bore 44 to releasably clamp the closure plate 45 to the casing bottom (see FIGS. 4, 8 and 9).

Figure 12:
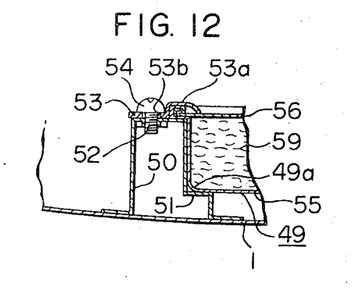
FIG. 12 is a fragmentary cross-sectional view taken along the line C—C in FIG. 5, illustrating the manner in which the oil tank is mounted on the main casing.

An oil tank or reservoir 49 is mounted in the space defined between the bottom wall of the warmer casing 1 and the cover pad 4 and held on the casing bottom by means of a plurality of stepped supports 50 in an appropriate position opposite to the combuster-element exchange opening 40. Each of the supports 50 includes an inner member stepped as at 51 to support the adjacent bottom edge portion 49a of the oil tank and an outer member connecting with the inner member by a top portion formed with a threaded aperture 52, and is firmly secured by welding or other suitable means to the inside bottom of the casing 1. The oil tank 49 is of a flattened cylindrical configuration having a height substantially equal to or less than the depth of the casing and is supported at the opposite bottom edges 49a by the stepped portions 51 of the supports 50, as described above. Also, the oil tank 49 is firmly held in the supported position by means of retainers 53 secured to the top of the stepped supports 50 (FIG. 12). As shown, each of the retainer 53 has a threaded aperture 53b formed therein to receive a clamp screw 54, which is threaded into the aperture 52 formed in the top of the support. Each of the retainers has an extension 53a which engages the top wall of the oil tank 40 to securely hold the latter in the casing 1.

Figure 13:
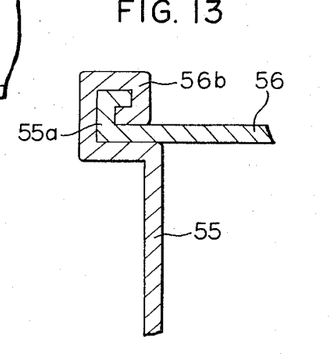
FIG. 13 is a cross-sectional view taken along the line D—D in FIG. 5.

The oil tank 49 is composed of a dished body portion 55 formed of brass or the metal sheet material and a planar cover portion 56 of the same material covering to the top opening of the body portion 55, the peripheral edges of the two portions being sealed liquid-tight as by seam welding. This tank structure is preferable from the viewpoint of preventing oil leakage from the oil tank and from the manufacturing viewpoint. Particularly it is preferable to give to the tank a circular profile in plan. To join the overlapping peripheral edges of the body and cover portions of the oil tank by seam welding, both edges 55a and 56a are suitable rolled back beforehand as shown in FIG. 13.

Figure 5:
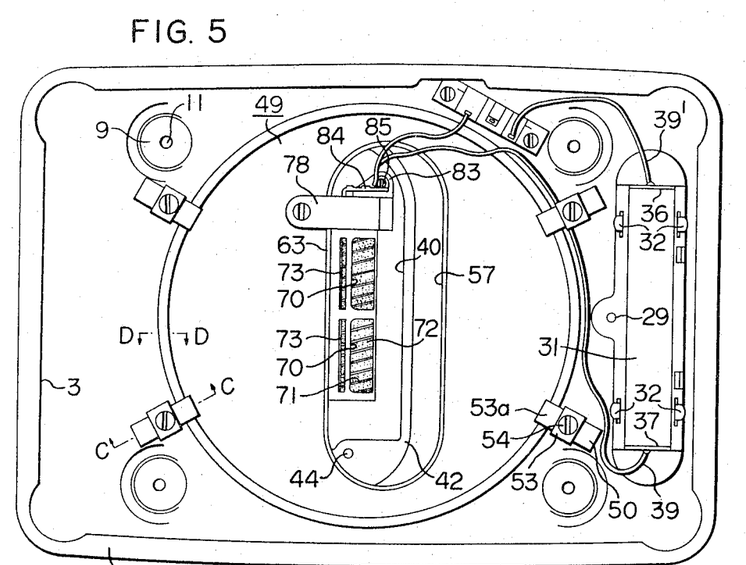
FIG. 5 is a top plan view of the body warmer with the cover pad removed.
Figure 6:
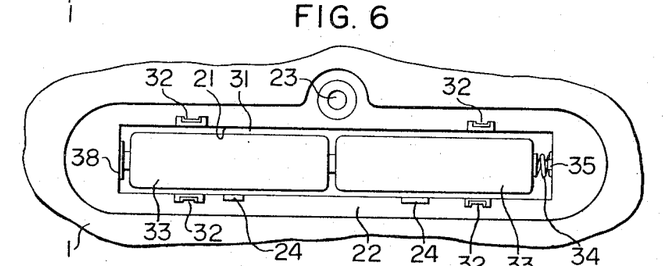
FIG. 6 is an enlarged view showing the battery encasement portion of the casing shown in FIG. 4 with the encasement cover removed.
Figure 7:
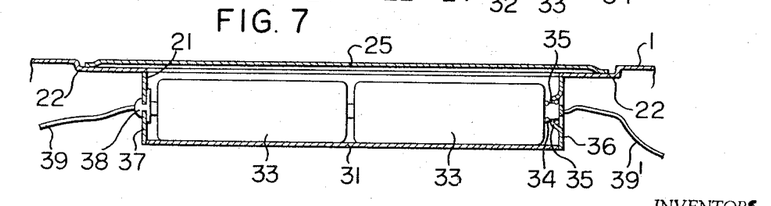
FIG. 7 is an enlarged cross-sectional view taken along the line B—B in FIG. 4.

Formed in the oil tank 49 eccentrically along its transverse axis is a tunnel-like elliptical, circular or rectangular through hole 57 extending through the tank structure in alignment with the combuster-element exchange opening 40 formed in the casing bottom (FIGS. 1 and 5). The walls 58 defining the through hole 57 are formed integral with the body portion 55 of the tank and are secured liquid-tight to the peripheral edge of an aperture formed in the cover portion 56 of the tank by seam welding. Filled in the oil tank 49 constructed in this manner is an absorbent material such as felt or cotton to store a volatile liquid fuel such as benzene. Formed in one of the longitudinal walls 58 observable from the exterior through the exchange opening 40 is a gasified-fuel feed port 60 extending transversely of the through opening 57 and defined by an elongated circular wall 60a. A mesh 61 of wire or other heat- and corrosion-resistant material is secured as by welding to the inside of the gasified-fuel feed port 60 so as to cover the latter for the purpose of holding in place the oil-impregnated material 59 filled in the oil tank 49.

Figure 8:
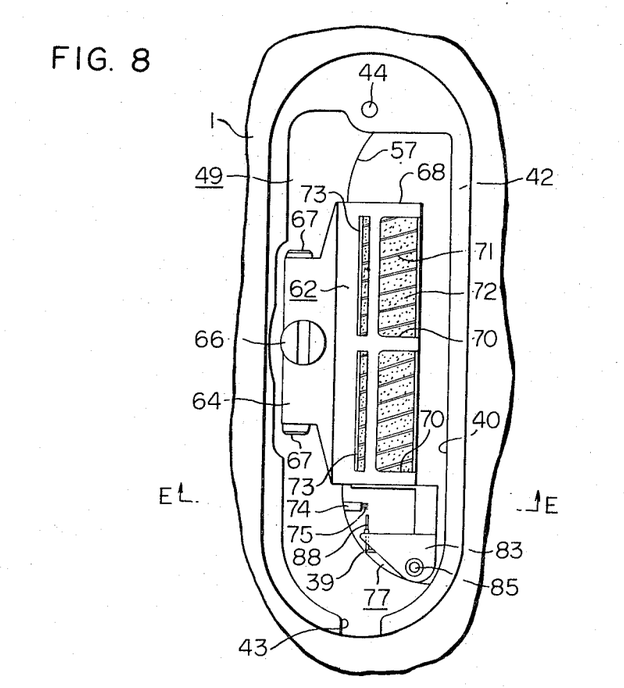
FIG. 8 is an enlarged view showing the exchange opening portion of the casing shown in FIG. 4 with the closure plate removed.

Reference numeral 62 indicates a channel-shaped combuster-element holder formed of brass or other heat- and corrosion-resistant metal material and opening sidewise as at 63 to fit over the wall 60a of the gasified-fuel feed port 60. The holder 62 forms a combuster unit in combination with a platinum-asbestos element described hereinafter. Formed on one of the longitudinal edges of the opening 63 is a mounting lug 64 to be detachably secured to the bottom portion of the oil tank 49 which is exteriorly observable through the exchage opening 40 and in which a threaded bore 65 is formed to receive a clamp screw 66 inserted through a hole formed in the lug 64 (FIGS. 1 and 8). Formed on the opposite sides of the mounting lug 64 are grip lugs 67 extending therefrom toward the exchange opening 40 when the holder 62 is in the assembled position. It is to be understood that the lugs 67 are provided to facilitate manual insertion and removal of the holder 62 through the exchange opening 40. The opposite walls or legs of the channel-shaped body portion 68 combuster-element holder 62 are respectively formed with a plurality of apertures 70 for passage of supply air to the platinum-asbestos element 72 received in the channel-shaped holder body 68. A gas-permeable retainer 71 formed of a heat- and corrosion-resistant material is employed to retain the platinum-asbestos element 72 and, as shown, takes the form of a helically coiled spring. Each of the opposite walls of the channel-shaped holder body portion 68 carries upturned lugs 73 which extend therefrom in a plane parallel to the axis of the retainer ring 71 and slightly offset therefrom toward the opening 63 of the channel-shaped holder 62 to engage a portion of the retainer ring 71 so that the platinum-asbestos element 72 is effectively prevented from moving toward the opening 63 of the combuster-element holder 62. Also, the platinum-asbestos element 72 is held in the channel-shaped body portion 68 of the holder 62 against axial displacement by lugs (not shown) which extend from the opposite ends of the channel-shaped holder body portion 68 to engage the respective end portions of the retainer ring 71 (FIGS. 1, 5 and 8).

The platinum-asbestos element 72 is a mass of asbestos with platinum adhering thereto, suitably formed by mixing together asbestos and platinum in the weight ratio of 100:2 to 15, and is most preferred as a catalyst for combustion of gasefied fuel of benzene or the like under suitable temperature and air supply conditions. The engaging lugs, formed at the opposite ends of the channel-shaped holder body portion 68 to engage the retainer ring 71, serves not only to hold the latter in place but also to facilitate fuel ignition under the presence of the holder opening while increasing the air supply to the platinum-asbestos element.

Formed in a portion of the tank wall 58 which is closely adjacent to one end of the elongated gasified-fuel feed port 60 is a small-diameter through aperture in which a tubular wick holder 74 formed of a metal material is fitted fluid-tight. Fitted tightly in this tubular wick holder 74 is an ignition wick 75 formed of a strand of glass or cotton filaments. One end of the wick 75 is embedded in the oil-impregnated material 59 filled in the oil tank 49 while the other end of the wick is held in the tunnel-like through hole 57 in a position opposite to the ignition heater of the ignition unit 77.

Figure 15:
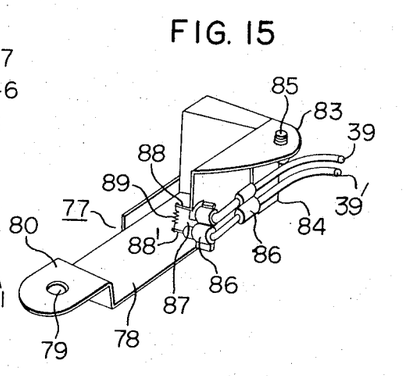
FIG. 15 is an enlarged perspective view of the ignition assembly shown in FIG. 8.

The ignition unit 77 includes a hood structure 78 made of sheet metal and opening toward the bottom of casing 1 and toward the combuster-element holder 62. Formed at one end of the hood 78 is a mounting lug 80 which is apertured as at 79 to receive a screw stud 82. The hood 78 is firmly secured to the oil tank 49 by threadably engaging the screw stud 82 into a threaded aperture 81 formed in the top wall of the oil tank 49. The hood structure 78 also includes a tongue 83 formed at its bottom and to which a heater holder 84 is secured by screw means 85. The heater holder 84 has a lug 86 to grippingly hold a pair of insulated conductors 39, 39'. The ends of the insulated conductors 39, 39' are led through a notch 87 formed in the hood 78 toward the ignition wick 75 and connected with respective electrodes 88, 88' arranged in closely spaced opposite relation to the ignition wick 75. An ignition heater 89 is arranged between the electrodes 88, 88' which is formed of a platinum-rhodium alloy wire (FIG. 15).

Figure 14:
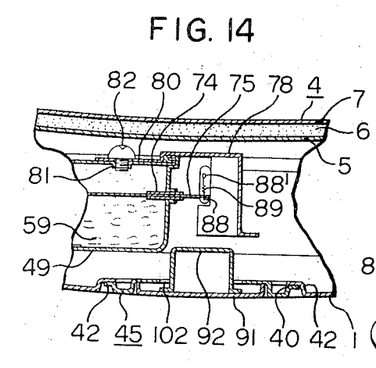
FIG. 14 is a cross-sectional view taken along the line E—E in FIG. 8.

The open side of the hood structure 78 which is adjacent to the combuster-element holder 62 is covered by the adjacent end of the channel-shaped body portion 68 of the combuster-element holder 62 in their assembled position. Since open end formation of the channel-shaped body portion 68 allows free passage of air therethrough, the platinum-asbestos element 72 can be ignited effectively by the heat of an igniting flame when it is formed on the ignition wick 75. Further, that open side 90 of the hood structure which is adjacent to the bottom wall of the main casing 1 is covered by an extinguishing disc 92 (FIG. 14) with a more or less distance therebetween. The extinguisher disc 92 is carried on an auxiliary cover plate 91 detachably secured to the closure plate 45, as will be described hereinafter in further detail.

Figure 16:
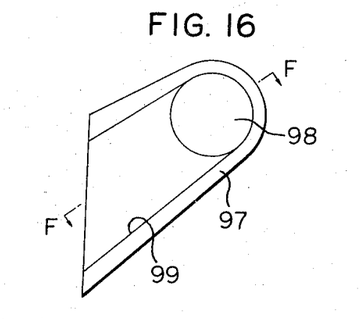
FIG. 16 is a top plan view of the fuel guide member.
Figure 17:
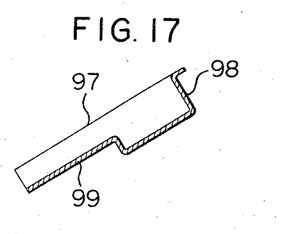
FIG. 17 is a cross-sectional view taken along the line F—F in FIG. 16.

Formed in the bottom wall of the main casing 1 on its side opposite to the battery encasement 31 is an inwardly protruding oil-replenishing port 93 for charging the oil tank 49 with benzine or other highly volatile liquid fuel. The oil-replenishing port 93 is conically shaped to facilitate oil replenishment with its truncated end opening to a fuel inlet port 94 formed in the adjacent wall of the oil tank 49 in spaced opposite relation to the oil-replenishing port 93. Fitted snugly in the fuel inlet port 94 is a fuel inlet bushing 96 which is formed of rubber or the like material and has an axial fuel passageway 95 formed therein. A fuel guide member 97 is suitably secured to the oil tank 49 inside thereof as by welding in a position opposite to the fuel inlet bushing 96 and is generally of a trough-like configuration having a U-shaped transverse and an L-shaped longitudinal cross section. As illustrated in FIGS. 16 and 17, the fuel guide 97 is formed at one end opposite to the fuel inlet bushing 96 with a recess or cavity 98 for accommodating a valve disc, described below, and has a conduit channel 99 extending from the cavity 98 to the other end of the fuel guide. The open end of the conduit channel 99 is disposed in the gasified-fuel feed aperture 60 so that liquid fuel charged through the fuel inlet bushing 96 is immediately conducted into the gasified-fuel feed aperture 60.

Accommodated in the cavity 98 formed in the fuel guide 97 is a resilient biasing member 100 formed of a piano wire or like spring material. A valve plate 101 of corrosion-resistant material is carried on one end of the resilient biasing member 100 and is normally biased under the resilience thereof into a position tightly engaging the inlet opening 96a of the fuel inlet bushing 96. In use of the body warmer, when it is desired to charge the oil tank 49 with liquid fuel, the tip of an appropriate oil dispenser tube is inserted through the oil-replenishing port 93 of the main casing 1 and through the fuel inlet bushing 96 to depress the valve disc 101 against the resilience of biasing member 100 and then is operated to dispense fuel as required. Upon completion of the fuel replenishment, the oil dispenser tube is removed to release the valve disc 101 to allow the latter to restore under the resilience of the biasing member 100 to the normal position closely engaging the adjacent edge of the fuel inlet bushing 96. With this arrangement, it will be appreciated that replenishment of liquid fuel can be performed with extreme convenience and any leakage or vaporization of fuel charged can be effectively prevented because of the fact that the oil inlet opening 96a is automatically closed tightly each time the oil-replenishing operation has been completed (FIG. 1)

Figure 9:
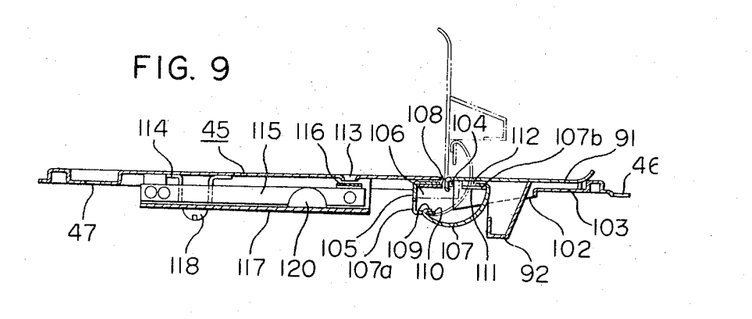
FIG. 9 is an enlarged cross-sectional view of the closure plate for the exchange opening.
Figure 10:
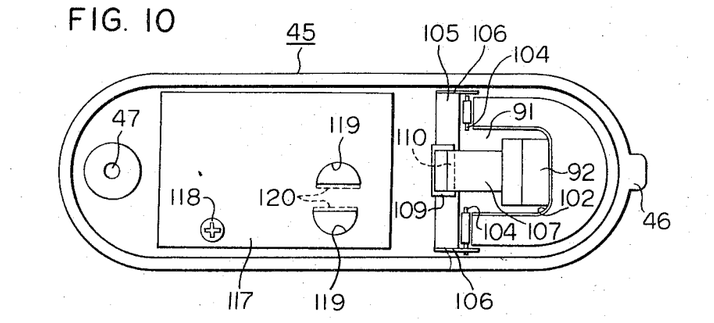
FIG. 10 is a bottom view of the closure plate shown in FIG. 9.

The structure of the closure plate 45 will next be described in further detail. As shown in FIGS. 9 and 10, the closure plate 45 is formed with an ignition aperture 102 in a position opposite to the ignition wick 75. The ignition aperture 102 is shouldered as at 103 along its peripheral edge to receive an auxiliary cover plate 91 formed of the same material as the closure plate 45, as described hereinbefore.

The auxiliary cover plate 91 is pivotally mounted at one end on a pair of studs 104, which are carried by respective upturned bearing lugs 106 formed at the opposite ends of a support plate 105, which in turn is fixed as by welding to the edge of the ignition aperture 102 remote from the lug 46. As shown, a leaf spring 107 is bridged between the closure plate 45 and the auxiliary cover 91. For this bridging arrangement is provided an anchor 109 one end of which is fixedly inserted into the space 108 defined between the closure plate 45 and the support plate 105. The anchor 109 carries at the other end an engaging link 110 formed to engage one of the hooked ends 107a of the leaf spring 107, the other hooked end 107b of the latter being engaged in the space 112 between the auxiliary cover plate 91 and a detent piece 111 secured thereto closely to the pivotal connection of the cover plate 91. The leaf spring 107 is arcuately curved and acts to resiliently hold the auxiliary cover plate 91 in its operated position, closed or open. In other words, when the auxiliary cover plate 91 is moved from its closed solid-line position to opened dotted-line position or vice versa, the leaf spring 107, initially resisting the movement of the cover plate, starts to help its movement at the instant when one of the hooked ends 107b of the leaf spring 107 is moved across the plane including the other hooked end 107b of the leaf spring 107 and the pivotal axis of the auxiliary cover plate 91.

The opening or closing operation of the auxiliary cover plate 91 can thus be performed very smoothly and lightly by a minimum of manual operating force, rendering an extreme convenience to the user.

Also, provided on the closure plate 45 is a temperature indicating device which includes a viewing window 113 formed in the plate centrally thereof and indicator means provided on the back of the closure plate 45 in a suitable position relative to the window 113.

Figure 11:
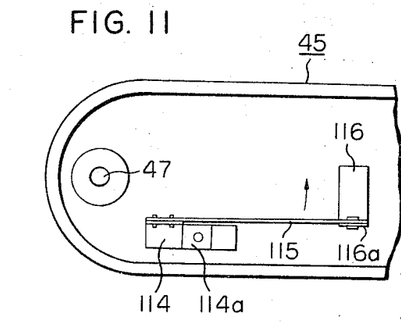
FIG. 11 illustrates the temperature indicator portion of FIG. 10 in its uncovered state.

The indicator means comprises a bimetal strip 115 which is secured at one end to a portion of the closure plate 45 adjacent to the through aperture 47 formed therein by way of a bracket 114 so as to allow deflection of the bimetal strip along the back surface of the closure plate 45. An indicator plate 116 is provided for indication through the window 113 and has formed at one end a lug 116a, which is secured as by riveting to the movable end of the bimetal strip 115. A rectangular cover 117 is secured to the back of the closure plate 45 so as to cover said viewing window 113. The cover 117 has a width corresponding to that of the closure plate 45 and is U-shaped in transverse cross section. The bracket 114, carrying the bimetal strip 115, has an integral raised portion 114a formed in a height corresponding to the depth of the U-shaped cover 117, and the latter is clamped by a screw stud 118 to the raised bracket portion 114a. The planar bottom portion of the U-shaped cover 117 is cut at a location close to the auxiliary cover plate 91 to form a pair of parallel lugs 120 on the opposite sides of the bimetal strip 115, leaving a pair of vent holes 119 in the cover 117. The lugs 120 serve to help the bimetal strip 115 to take to the atmospheric temperature as raised by the fuel combustion in the combuster unit while at the same time serving as stop means to limit the range of deflecting movement of the bimetal strip 115. The indicator plate 116 carries on its surface opposite to the viewing window 113 markings representing the burning or nonburning states of the warmer, preferably, in colors, red and white, for the respective warmer states. The temperature indicating device described above can be very conveniently used to visually determine the temperature of the atmosphere in the combuster region in the following manner. As the temperature of the atmosphere around the bimetal strip 115 is raised by the combustion of gasified-fuel on the platinum-asbestos element 72 of the combuster unit, the bimetal strip 115 is deflected in this embodiment in the direction indicated by the arrow in FIG. 11, carrying the indicator plate 116 to vary its position relative to the viewing window 113 so that the user can readily determine the atmospheric temperature in the combuster region simply by observing the indicator plate 116 through the window 113.

Reference numeral 121 indicates a tubular switching aperture formed in the bottom of the main casing 1 in an appropriate location apart from the oil tank 49 to accommodate an ignition switch described below. The tubular wall of the switching aperture 121 extends inwardly from the casing wall and is flanged at its extremity as indicated at 122 to engage a switch support 123, which has a central aperture 124 adapted to fit over the tubular wall of the switching aperture 121 and is secured thereto by caulking or other appropriate means. A pushbutton switch assembly 125 is secured to the switch support 123 by screw means 126 and includes a pushbutton 127 vertically movable in the switching aperture 121. It is preferable that the switch assembly 125 is so mounted that the pushbutton in its normal position does not extend outwardly beyond the bottom surface of the casing 1.

Figure 18:
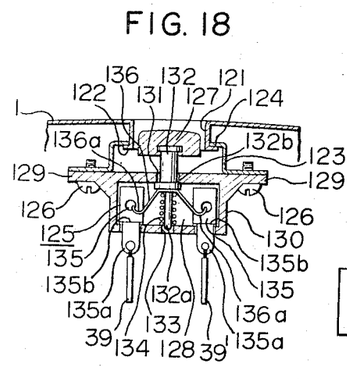
FIG. 18 is a fragmentary cross-sectional view showing one form of ignition switch assembly.
Figure 19:
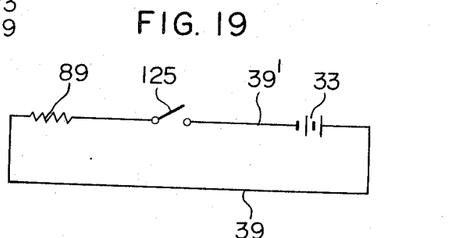
FIG. 19 is a diagrammatic showing of the ignition circuit.

The pushbutton switch assembly 125 illustrated in FIG. 18 includes a casing 130 formed of Bakelite, porcelain or other electrically insulating material and having an elongated rectangular cavity 128 and a pair of opposite mounting lugs 129. The switch casing 130 has a bearing aperature 131 formed in its wall facing the switching aperture 121 and an operating rod 132 carrying the pushbutton 127 is slidably fitted in the bearing aperture 131. The operating rod 132 includes a coaxial extension or reduced-diameter portion 132a which is loosely fitted at its extremity in a bearing aperture 133 formed in the opposite wall of the switch casing 130. A coiled spring 134 is arranged between the opposite wall of the casing 130 and the annular shoulder formed on the operating rod 132 to normally bias the latter toward the switching aperture 121. A pair of terminal strips 135 are arranged on the opposite sides of the reduced-diameter portion 132a of the operating rod 132 in the cavity 128 defined in the switch casing 130, each terminal strip having a connecting tab 135a extending outwardly through the adjacent casing wall. A contact member 136 is fixed intermediate its ends to the annular shoulder 132b formed on the operating rod 132 and is formed of phosphor bronze or other electroconductive sheet material, having a generally V-shaped configuration with its opposite ends carrying contact pieces 136a opposing the respective terminal strips 135. In operation of the pushbutton switch assembly 125, when the user depresses the pushbutton 127 through the switching aperture 121 against the bias of the coiled spring 134, the contact pieces 136a carried on the contact member 136 are brought into contacting engagement with the shouldered portions 135b of the terminal strips 135 to complete the ignition circuit diagrammatically shown in FIG. 19 thereby to ignite the combuster unit. After the ignition has been effected, the pushbutton 127 is released to open the ignition circuit. It will be recognized that the above-described ignition switch means can be operated with extreme convenience and is highly reliable compared to the cases where ignition is effected by match or other lighting means. It will be apparent that switch means of various types other than the pushbutton type described and shown herein, for example, microswitches now commercially available may also be be employed for the ignition purpose as long as they function to close the circuit only when they are operated for ignition. Also, the source battery in the ignition circuit may be eliminated by extending the lead wires connected to the ignition heater to terminals arranged on the outside of the main casing 1. In this case, the ignition heater can be energized by momentarily holding the terminals of a battery encased separately from the body warmer in contact with the terminals on the main casing.

In use, the body warmer of the present invention is operated in the following sequence. At first, benzine or other volatile liquid fuel is charged into the oil reservoir 49 through oil-replenishing port 93 so that the fuel being immediately gasified is fed through the gasified-fuel feed aperture 60 to the platinum-asbestos element 72 in the combuster unit while the ignition unit 77 is fed with gasified fuel through the ignition wick, which is impregnated with the liquid fuel filled in the oil tank 49. Then, the auxiliary cover plate 91 mounted on the closure plate 45 is manually operated into its open position indicated by the dotted lines in FIG. 9 and subsequently the pushbutton 127 of the ignition switch assembly is depressed to complete the ignition circuit. By doing this, the ignition heater 89 in the circuit is energized to red heat and ignites the surrounding gasified fuel, at the same time lighting the ignition wick 75. The combustion flame thus formed on the ignition wick 75 emits smoke outside of the auxiliary cover plate 91 so that the user can take notice of the combustion flame on the ignition wick 75. Hereupon, the user ceases to depress the pushbutton 127 to open the ignition circuit thereby to deenergize the ignition heater 89. On the other hand, the combustion flame on the wick 75 is effective to heat the platinum-asbestos element 72 through the perforated gas-permeable structure of the combuster-element holder 62 so that the fuel combustion is maintained with continuous supplies of air and gasified fuel under the catalytic action of the platinum-asbestos element 72 held at elevated temperature.

As soon as the combustion under the catalytic action is started, the auxiliary cover plate 91 is manually closed so that the ignition unit 77 is enclosed by the extinguisher plate 92 mounted on the closure plate 45 in cooperation with the combuster-element holder 62 and the hood 78 of the ignition unit per se. As the result, the combustion flame on the ignition wick 75 is extinguished because of the thus discontinued air supply to the ignition unit 77. As the combustion continues under the catalytic action of the platinum-asbestos element 72, the bimetal strip 115 of the temperature indicating device is increasingly deffected carrying the indicator plate 116 so that the user can readily observe the temperature of the atmosphere around the combuster unit by viewing the indicator plate 116 through the window 113.

It is generally impossible to stop the fuel combustion aided by the platinum-asbestos element 72 at any desired moment. The user desiring to extinguish the warmer is thus obliged to wait until the fuel combustion under the catalytic action comes to an end when the liquid fuel charged in the oil tank 49 is used up.

In use, the body warmer of the present invention is applied to the user's body with its cover pad 4 held in direct contact therewith. It can conveniently be applied to the user's back waist or belly and can also be laid on the laps or under the hips of the user when he is seated. If necessary to keep the body warmer in contact with the user's body, bands 18 and 18' can be used conveniently.

It has been found experimentally that no flame can be formed during the normal combustion under the catalytic action of the platinum-asbestos element 72 even if the pushbutton 127 is depressed to energize the ignition heater 89 because on this occasion the ignition unit is in an enclosed state and on one side is freely communicating with the platinum-asbestos element, precluding any substantial supply of oxygen to the ignition unit. This obviously holds even with use of the auxiliary cover plate 91.

As will be apparent from the foregoing description made in conjunction with one preferred embodiment of the present invention, the body warmer of the invention is so designed that it can be assembled conveniently with extreme ease and efficiency with all the necessary component parts, including the oil tank, combuster-element holder, closure plate for the exchange opening carrying an auxiliary cover plate, ignition switch unit and fuel supply means including the oil-replenishing and oil inlet ports, all mounted concentratedly on the main casing structure of the body warmer.

Also, according to the present invention, the oil tank, having a tunnel-like through hole formed centrally thereof in opposed relation to the combuster-element exchange opening formed in the main casing, includes a gasified-fuel feed port formed in the wall defining the tunnel-like through hole and an ignition wick arranged in the same wall adjacent to the gasified-fuel feed port, as described hereinbefore. The ignition wick thus can be readily ignited by means of an ignition heater which is arranged to be energized by a battery output under control of an ignition switch. With this arrangement, it will be appreciated that the user of the body warmer need not carry any match or lighter himself because the fuel ignition and combustion can be effected precisely by energization of the ignition heater with a battery accommodated in the body warmer and any reduction in combustion efficiency due to contamination of the platinum-asbestos element unavoidable in cases matches are used for fuel ignition can be effectively prevented. In addition, if it is required to exchange the combuster unit, for example, when the platinum-asbestos element is contaminated by any chance, the combuster unit can conveniently be exchanged through the exchange opening by removal of the closure plate.

Another advantage of the present invention is that any draining of liquid fuel through the gasified-fuel feed aperture and hence its dripping off the combuster unit are prevented effectively eliminating the danger of leaping flames or unusual fuel combustion thereby to ensure safety in use of the warmer. This is due to the fact that the elliptically shaped tunnel-like through hole formed in the oil tank is elongated in the direction of the medial axis of the main casing 1 and the gasified-fuel feed aperture is formed in one of the longitudinal walls of said tunnel-like through hole so that, when the body warmer is set in a vertical position with its edge opposite to the gasified-fuel feed aperture and ajacent to the battery encasement turned downward, that portion of liquid fuel previously held in the oil tank on one side of the tunnel-like through hole immediately rushes under gravity into the other side of the oil tank through its restricted passages formed along the through hole.

A further advantage of the present invention is that the flame formed on the ignition wick can be extinguished with certainty after the flame has served to start fuel combustion in the combuster unit. This owes to the fact that the air supply to the ignition unit is discontinued as soon as the auxiliary cover plate mounted on the closure plate is closed to enclose the ignition unit in cooperation with the combuster-element holder and the hood of the ignition unit per se.

It will be appreciated that according to the present invention an improved body warmer is provided which has various advantageous features as mentioned above and is conveniently usuable to warm any selected body portion outdoors with its simple and rationalized design.

Though one specific embodiment of the present invention has been shown and described herein, it will be apparent to those skilled in the art that the invention is not restricted to the details set forth but many changes and modificaions may be made without departing from the spirit and scope of the invention as defined in the annexed claims.

What we claim is:

1. A body warmer of the type in which liquid fuel is burned with the aid of a platinum catalyst comprising: a rectangular casing generally arcuate in transverse cross section and largely open at the top with an elongated combuster-element exchange opening formed in the bottom wall of said casing and extending medially thereof; a closure member detachably secured to said casing to close the top opening thereof; a flattened cylindrical oil tank mounted in said casing and having a tunnel-like through hole in a central position opposite to said combuster-element exchange aperture with a gasified-fuel feed port formed in one of the walls defining said central through hole in said oil tank; a combuster unit including a combuster-element holder coveringly connected with said gasified-fuel feed port and a platinum-asbestos element held in said holder; an ignition wick arranged adjacent to said gasified-fuel feed port in said one of the walls defining said tunnel-like through hole; an ignition unit including a hood of sheet metal opening toward the bottom wall of said casing and toward said combuster-element holder and carrying an ignition heater; a closure plate detachably secured to said combuster-element exchange opening with an auxiliary cover plate pivotally mounted thereon and an extinguisher plate mounted on said auxiliary cover plate for movement into and out of a position opposite to the side of said hood facing toward the casing bottom; an ignition switch assembly mounted on the bottom wall of said casing inside thereof and operable to open and close an ignition circuit including said ignition heater; and fuel feed means including a fuel-replenishing port formed in the bottom wall of said casing, a normally closed fuel inlet port formed in the bottom wall of said oil tank in conjunction with said fuel-replenishing port, and means for conducting fuel from said fuel inlet port to said gasified-fuel feed port.

2. A body warmer as claimed in claim 1 in which said oil tank is formed eccentrically thereof with a tunnel-like through hole extending between the top and bottom walls of said oil tank and having a circular transverse cross section.

3. A body warmer as claimed in claim 1 in which said combuster unit includes a combuster-element holder in the form of a heat- and corrosion-resistant metallic channel member of U-section opening in a direction to cover said gasified-fuel feed port and having a mounting lug extending from one of the side walls of said channel member, a gas-permeable, heat- and corrosion-resistant retainer ring placed in said channel member, and a platinum-asbestos element held in said retainer ring, said channel member being formed in both side walls with a plurality of through apertures for air supply to said platinum-asbestos element and carrying lugs extending inwardly from the respective side walls of the channel member to engage a portion of said retainer ring for the purpose of preventing dislocation thereof toward the opening of said channel member.

4. A body warmer claimed in claim 1 in which said ignition unit includes a hood member formed of sheet metal to define a space opening toward the bottom of said casing and toward the combuster-element holder when the ignition unit is in a state assembled in the warmer and an ignition heater arranged in said space in a closely spaced opposite relation to said ignition wick, one of the open sides of said hood member in its assembled position being covered by the channel member of said combuster-element holder with the other open side of said hood member covered by said extinguisher plate spaced therefrom.

5. A body warmer as claimed in claim 1 in which said closure plate includes an ignition aperture formed in its portion opposite to said ignition wick, an auxiliary cover plate movable into and out of a position to cover said ignition aperture, and an extinguisher plate mounted on said auxiliary cover plate in association with that side of said hood member facing toward the bottom of said casing, said auxiliary cover plate being pivotally mounted at one end on pivot pins secured to the opposite edges of said ignition aperture in the closure plate, and arcuately formed leaf spring means arranged between said auxiliary cover plate and said closure plate so as to aid the pivotal movement of said auxiliary cover plate in either direction and hold the latter in either closed or open position.

6. A body warmer as claimed in claim 1 in which said closure plate includes a temperature indicating device composed of indicator means including a temperature-responsive bimetal strip mounted on the inside of said closure plate in a position opposite to said combuster-element holder and a viewing window formed in said closure plate to enable the user to observe said indicator means from the outside of the closure plate.

7. A body warmer as claimed in claim 1 in which said fuel feed means includes a tubular fuel-replenishing port formed in the bottom of said casing and inwardly protruding therefrom, a fuel inlet port formed in a bottom portion of said oil tank in a position opposite to the extremity of said fuel-replenishing port, a fuel inlet bushing having an axially extending fuel passageway and fitted in said fuel inlet port, said fuel inlet bushing being formed to fit over said fuel-replenishing port in a liquid-tight fashion, and a valve disc arranged inside of said fuel inlet port and normally biased to make close contacting engagement with the adjacent edge of said fuel inlet bushing to close said fuel inlet port formed in the tank bottom.

8. A body warmer as claimed in claim 1 in which said fuel feed means includes a tubular fuel-replenishing port formed in the bottom of said casing and inwardly protruding therefrom, a fuel inlet port formed in a bottom portion of said oil tank in a position opposite to the extremity of said fuel-replenishing port, a fuel inlet bushing having an axially extending fuel passageway and fitted in said fuel inlet port, said fuel inlet bushing being formed to fit over said fuel-replenishing port in a liquid-tight fashion, a valve disc arranged inside of said fuel inlet port and normally biased to make close contacting engagement with the adjacent edge of said fuel inlet bushing to close said fuel inlet port, and a fuel guide member having a cavity formed in one end portion thereof to accommodate said valve plate and a conduit extending from said cavity toward the other end of said fuel guide member and opening into said gasified-fuel feed port.

9. A body warmer as claimed in claim 1 in which said oil tank is formed eccentrically thereof with a tunnel-like through hole extending between the top and bottom walls of said oil tank and having an elliptical transverse cross section.

10. A body warmer as claimed in claim 1 in which said oil tank is formed eccentrically thereof with a tunnel-like through hole extending between the top and bottom walls of said oil tank and having a rectangular transverse cross section.

References Cited by the Examiner
UNITED STATES PATENTS

| | | | |
|---|---|---|---|
| 2,942,601 | 6/1960 | Smith | 126—208 |
| 3,046,975 | 7/1962 | Gottwald | 126—208 |
| 3,110,301 | 11/1963 | Bricker | 126—208 |

FREDERICK L. MATTESON, Jr., *Primary Examiner.*
EDWARD G. FAVORS, *Assistant Examiner.*